US011715397B2

(12) United States Patent
Iwasaki

(10) Patent No.: US 11,715,397 B2
(45) Date of Patent: Aug. 1, 2023

(54) VEHICLE DISPLAY DEVICE THAT PERFORMS BLUR PROCESSING OR WIDENING PROCESSING ON A DISPLAY IMAGE

(71) Applicant: Yazaki Corporation, Tokyo (JP)

(72) Inventor: Katsuhiko Iwasaki, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 17/676,237

(22) Filed: Feb. 21, 2022

(65) Prior Publication Data

US 2022/0277673 A1    Sep. 1, 2022

(30) Foreign Application Priority Data

Feb. 26, 2021   (JP) .................................. 2021-029704

(51) Int. Cl.
    *G09G 3/00*       (2006.01)
    *B60K 35/00*      (2006.01)
    *G06F 3/01*       (2006.01)
    *G06T 5/00*       (2006.01)

(52) U.S. Cl.
    CPC ............ *G09G 3/002* (2013.01); *B60K 35/00* (2013.01); *G06F 3/013* (2013.01); *G06T 5/002* (2013.01); *B60K 2370/52* (2019.05); *B60K 2370/736* (2019.05); *B60K 2370/741* (2019.05); *G09G 2380/10* (2013.01)

(58) Field of Classification Search
    None
    See application file for complete search history.

(56) References Cited

U.S. PATENT DOCUMENTS

| 2014/0268359 | A1  | 9/2014  | Yuki et al. |
| 2016/0133170 | A1* | 5/2016  | Fateh .................. G06F 3/04817 345/428 |
| 2016/0159280 | A1  | 6/2016  | Takazawa et al. |
| 2016/0379412 | A1* | 12/2016 | Butler .................... G02B 27/01 345/633 |
| 2017/0206712 | A1* | 7/2017  | Petrovskaya ........... G06F 3/012 |
| 2018/0066956 | A1* | 3/2018  | Kim ...................... G06T 19/006 |
| 2018/0146121 | A1* | 5/2018  | Hensler .................. G06T 7/174 |
| 2018/0335623 | A1  | 11/2018 | Arai et al. |

FOREIGN PATENT DOCUMENTS

| DE | 102014206569 A1 | 10/2015 |
| JP | 2019-28328 A    | 2/2019  |

* cited by examiner

*Primary Examiner* — Jason A Pringle-Parker

(74) *Attorney, Agent, or Firm* — Kenealy Vaidya LLP

(57) ABSTRACT

Provided is a vehicle display device that includes: an image display unit that emits display light of an image; an optical system that projects the display light emitted from the image display unit toward a reflection face in front of a driver; and a controller that controls the image display unit. The image has a first region that is a region viewed by both eyes of the driver and a second region that is a region of the image on an end part side in an image lateral direction relative to the first region. In a case where a graphic image included in the image is across a boundary between the first region and the second region, the controller executes blur processing on the graphic image.

11 Claims, 11 Drawing Sheets

VEHICLE DISPLAY DEVICE THAT PERFORMS BLUR PROCESSING OR WIDENING PROCESSING ON A DISPLAY IMAGE

CROSS-REFERENCE TO RELATED APPLICATION(S)

The present application claims priority to and incorporates by reference the entire contents of Japanese Patent Application No. 2021-029704 filed in Japan on Feb. 26, 2021.

BACKGROUND OF THE INVENTION

1. Field of the Invention

The present invention relates to a vehicle display device.

2. Description of the Related Art

Conventionally, there is a device for displaying images in a vehicle. Japanese Patent Application Laid-open No. 2019-28328 discloses an optical presentation device that emits light to a transparent member provided in a vehicle and displays an image formed by the light reflected by the transparent member toward a visual observation point side on the transparent member.

In regards to enhancing the visibility of images, there is still room for improvement. For example, in a case of projecting an image having a region that cannot be viewed by both eyes, it is preferable to be able to suppress deterioration in the visibility caused by parallax between the left and right eyes.

SUMMARY OF THE INVENTION

An object of the present invention is to provide a vehicle display device capable of enhancing the visibility of images.

A vehicle display device according to one aspect of the present invention includes an image display unit that emits display light of an image; an optical system that projects the display light emitted from the image display unit toward a reflection face in front of a driver; and a controller that controls the image display unit, wherein the image has a first region that is a region viewed by both eyes of the driver and a second region that is a region of the image on an end part side in an image lateral direction relative to the first region, and in a case where a graphic image included in the image is across a boundary between the first region and the second region, the controller executes blur processing on the graphic image.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENT

Hereinafter, a vehicle display device according to an embodiment of the present invention will be described in detail with reference to the accompanying drawings. Note that the present invention is not limited by the embodiment. Furthermore, the structural elements of the embodiment described hereinafter include elements easily occurred to those skilled in the art or substantially the same elements.

Embodiment

Figure 1:
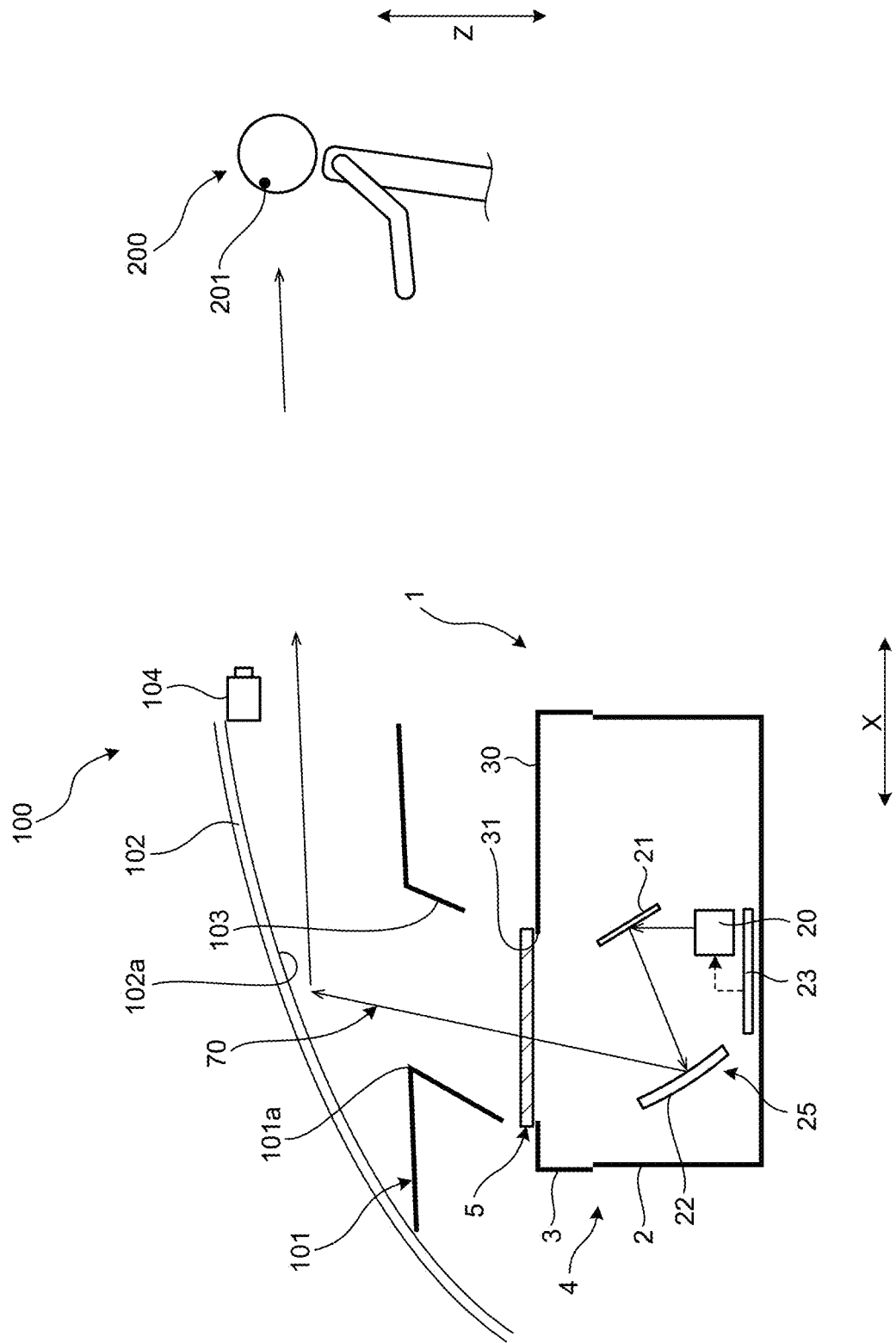
FIG. 1 is a schematic configuration diagram of a vehicle display device according to an embodiment.
Figure 2:
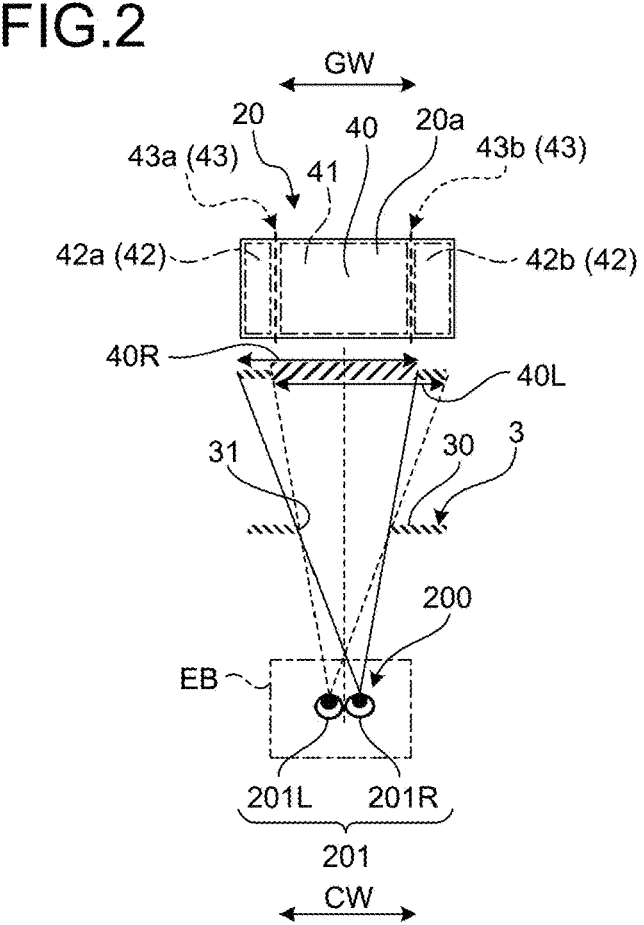
FIG. 2 is a diagram illustrating a range that can be viewed by the left and right eyes.
Figure 3:
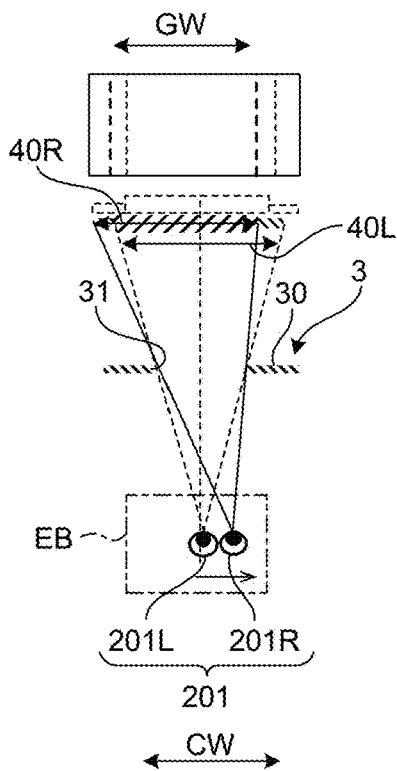
FIG. 3 is a diagram illustrating a range that can be viewed by the left and right eyes.
Figure 4:
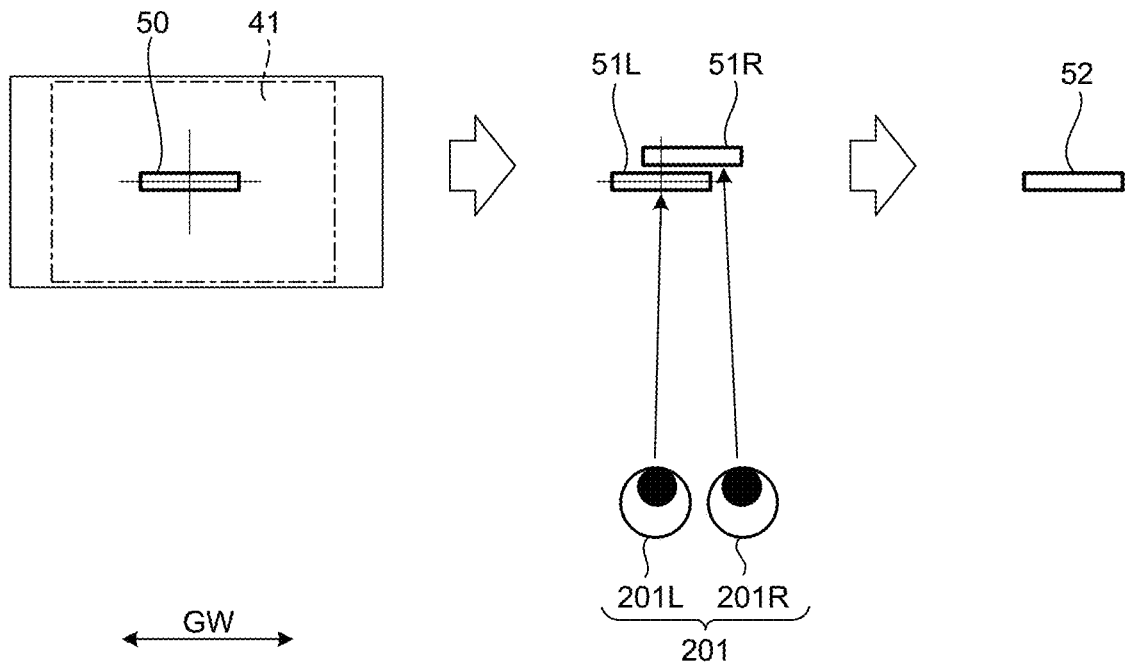
FIG. 4 is a diagram for describing how a graphic image displayed in a first region is viewed.
Figure 5:
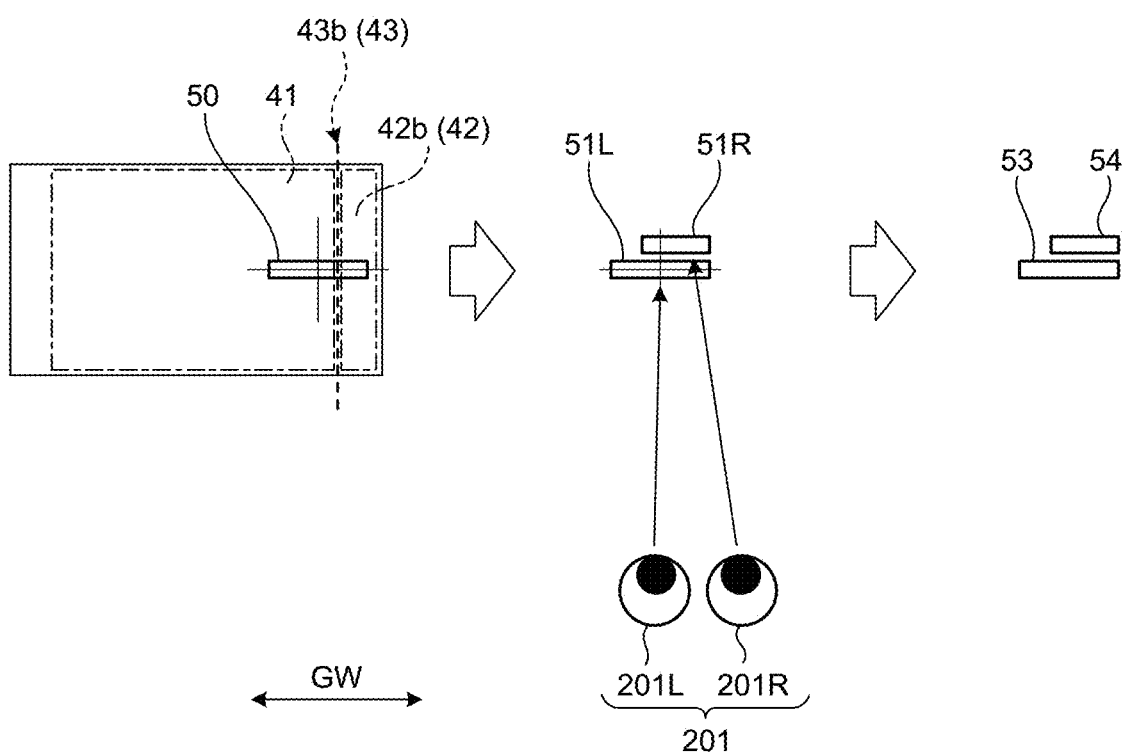
FIG. 5 is a diagram for describing generation of double images.
Figure 6:
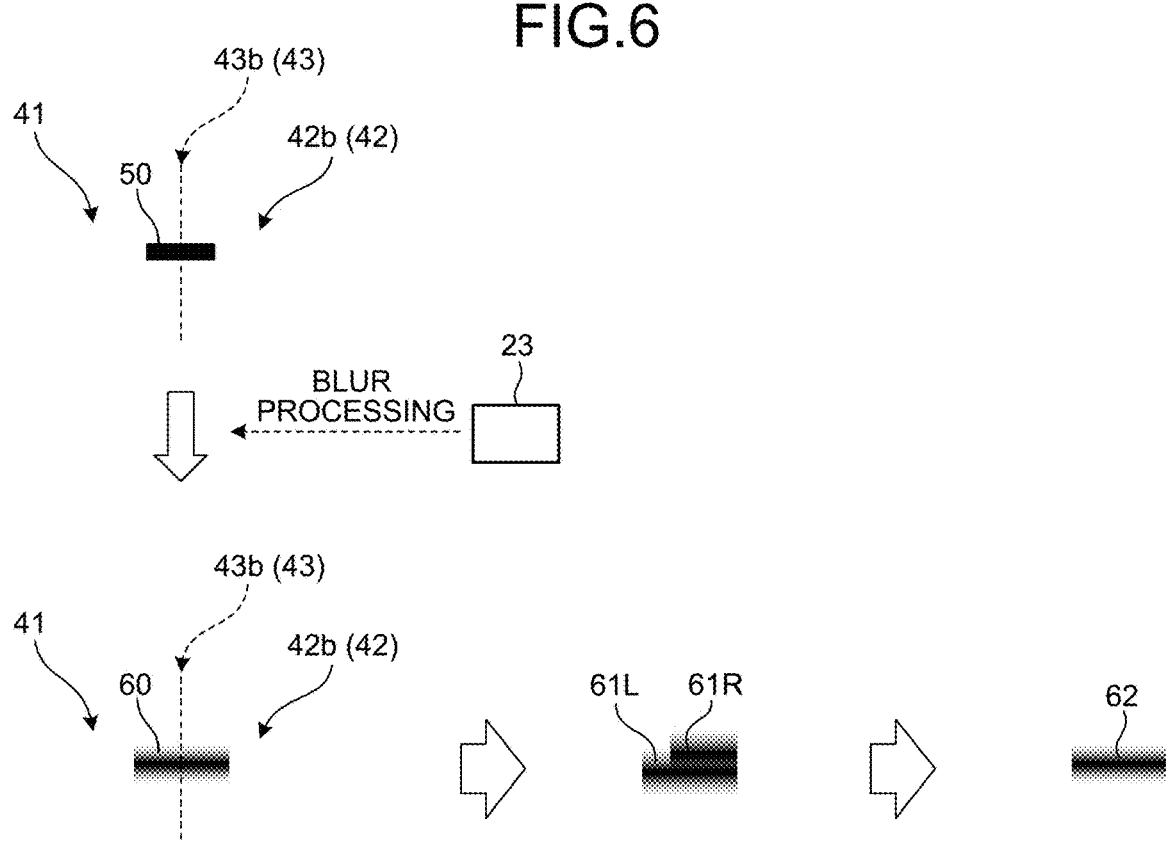
FIG. 6 is a diagram for describing blur processing of the embodiment.
Figure 6:
Figure 7:
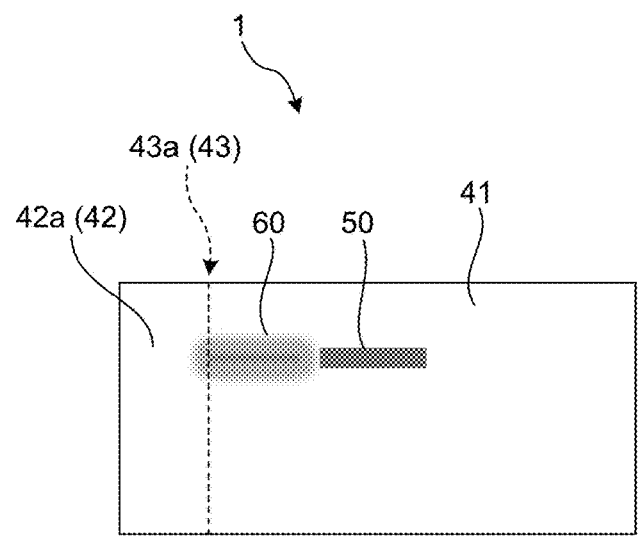
FIG. 7 is a diagram for describing the blur processing of the embodiment.
Figure 8:
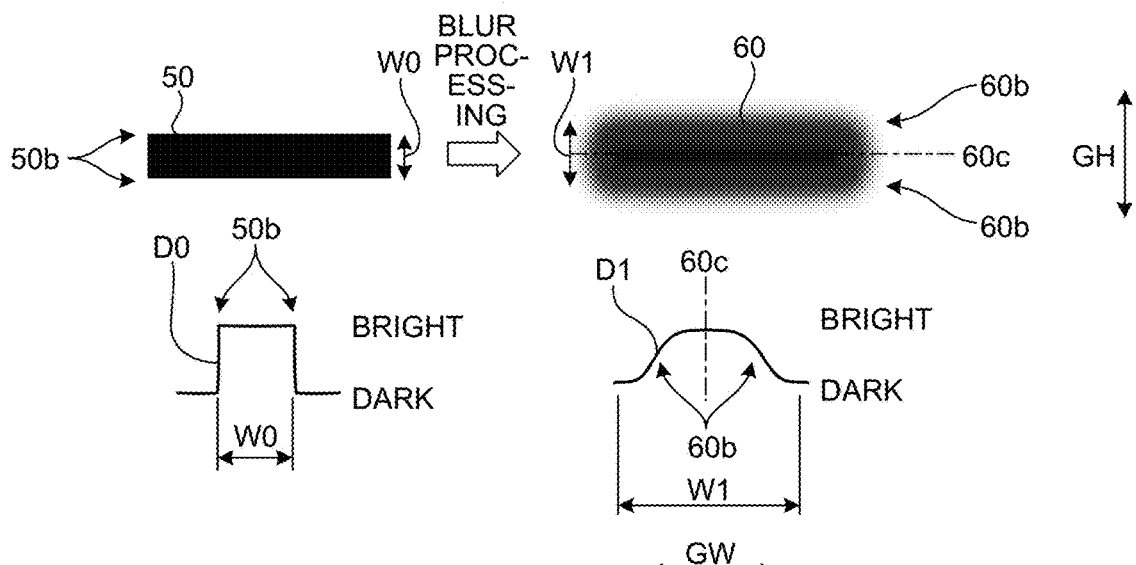
FIG. 8 is a diagram illustrating an example of the blur processing of the embodiment.
Figure 9:
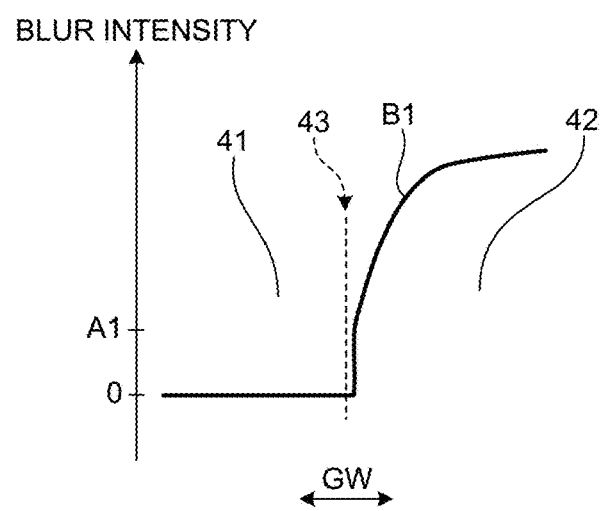
FIG. 9 is a chart illustrating an intensity distribution regarding blur intensity.
Figure 10:
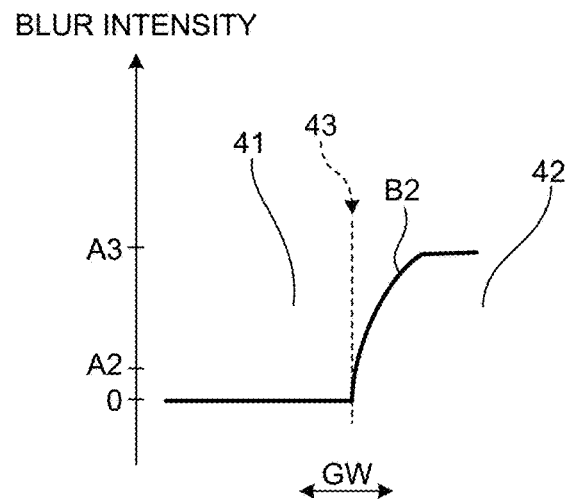
FIG. 10 is a chart illustrating an intensity distribution regarding blur intensity.

Referring to FIG. 1 to FIG. 20, the embodiment will be described. The embodiment relates to the vehicle display device. FIG. 1 is a schematic configuration diagram of the vehicle display device according to the embodiment, FIG. 2 and FIG. 3 are diagrams illustrating ranges that can be viewed by the left and right eyes, FIG. 4 is a diagram for describing how a graphic image displayed in a first region is viewed, FIG. 5 is a diagram for describing generation of double images, FIG. 6 and FIG. 7 are diagrams for describing blur processing of the embodiment, FIG. 8 is a diagram illustrating an example of the blur processing of the embodiment, and FIG. 9 and FIG. 10 are charts illustrating intensity distributions regarding the blur intensity.

Figure 11:
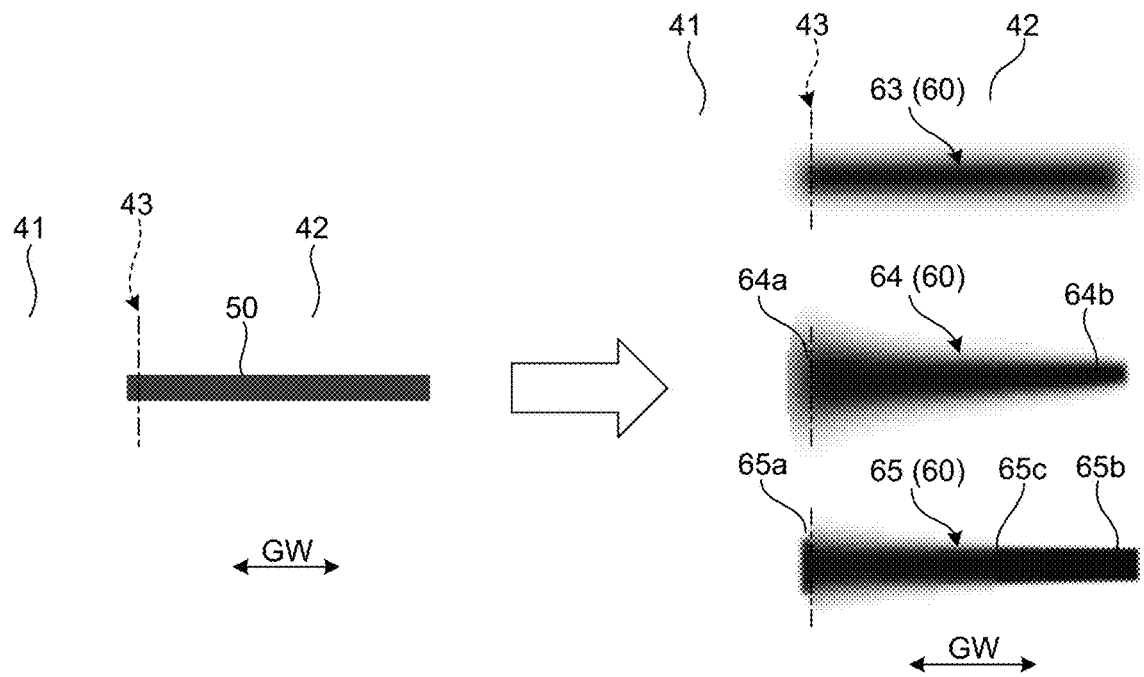
FIG. 11 is a diagram illustrating examples of a graphic image and an image that is being processed.
Figure 12:
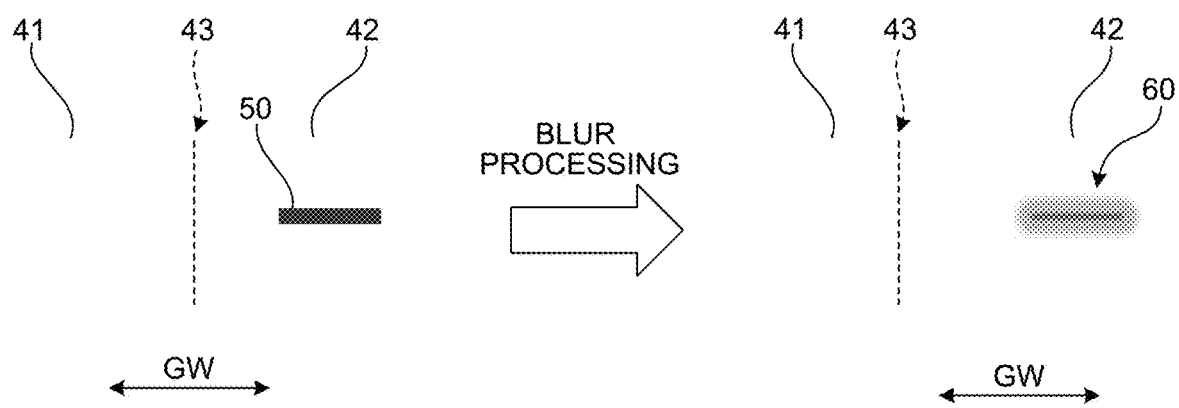
FIG. 12 is a diagram illustrating blur processing performed on a graphic image in a second region.
Figure 13:
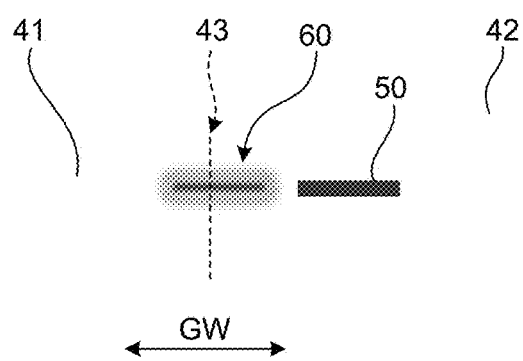
FIG. 13 is a diagram illustrating the graphic image displayed as it is in the second region without the blur processing performed thereon.
Figure 14:
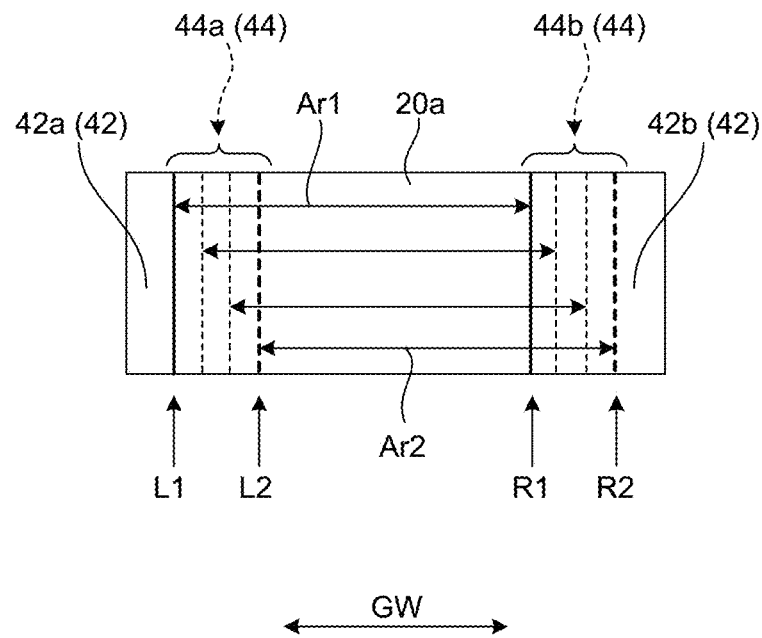
FIG. 14 is a diagram illustrating boundary lines determined according to the positions of the eyes.
Figure 15:
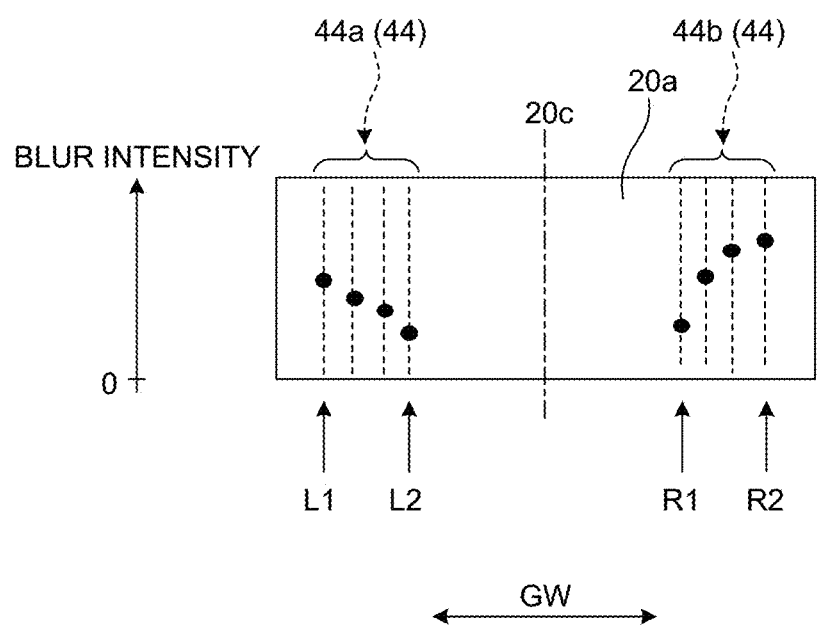
FIG. 15 is a diagram illustrating examples of the blur intensity defined according to the positions of the boundary lines.
Figure 16:
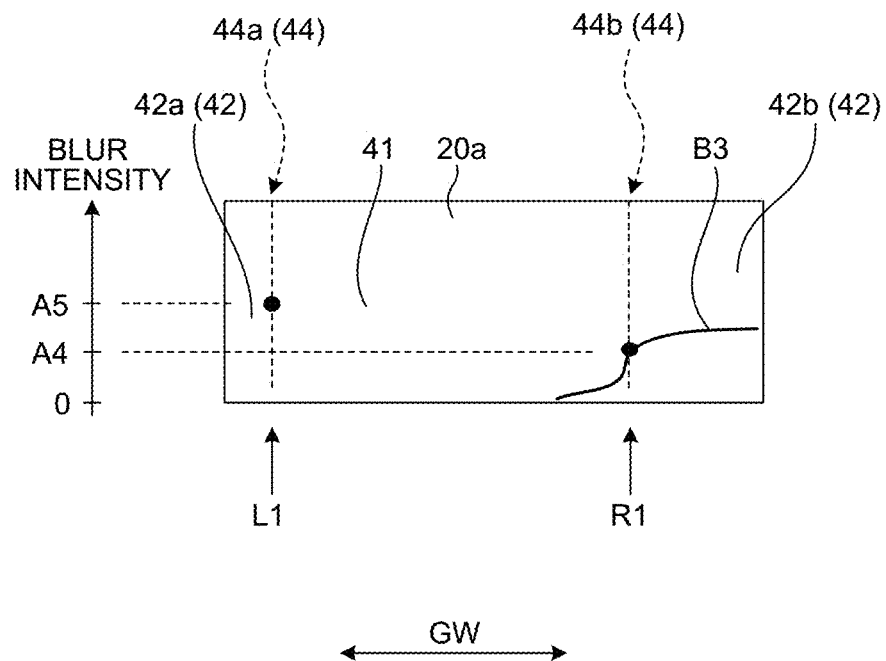
FIG. 16 is a diagram illustrating a distribution of the blur intensity according to the positions of the boundary lines.
Figure 17:
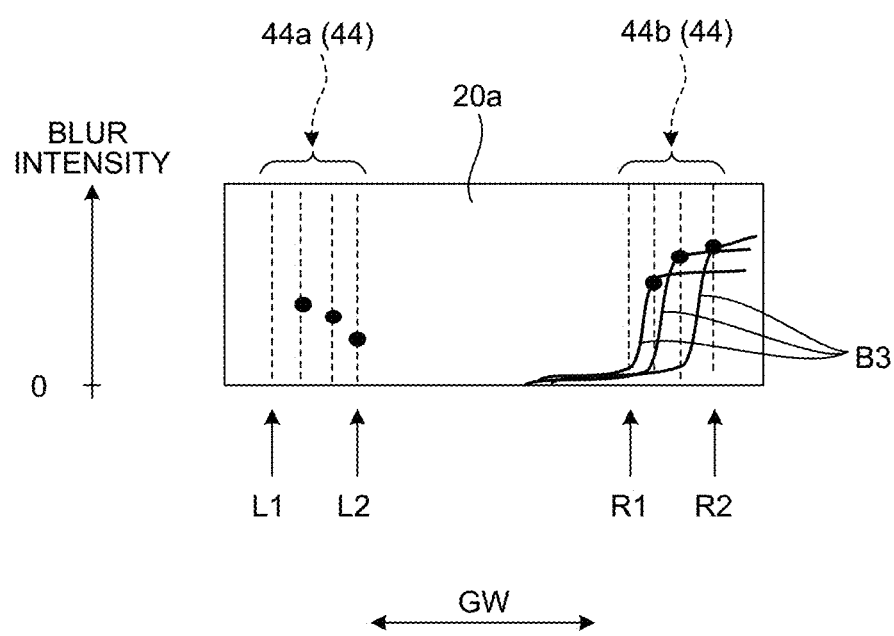
FIG. 17 is a diagram illustrating a distribution of the blur intensity according to the positions of the boundary lines.
Figure 18:
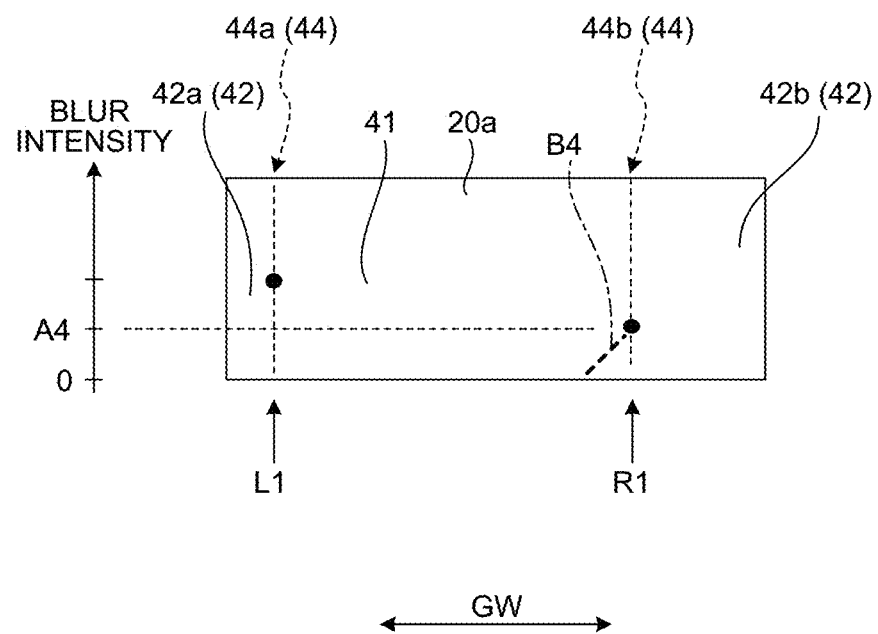
FIG. 18 is a diagram illustrating the blur intensity set on the front side relative to the boundary lines.
Figure 19:
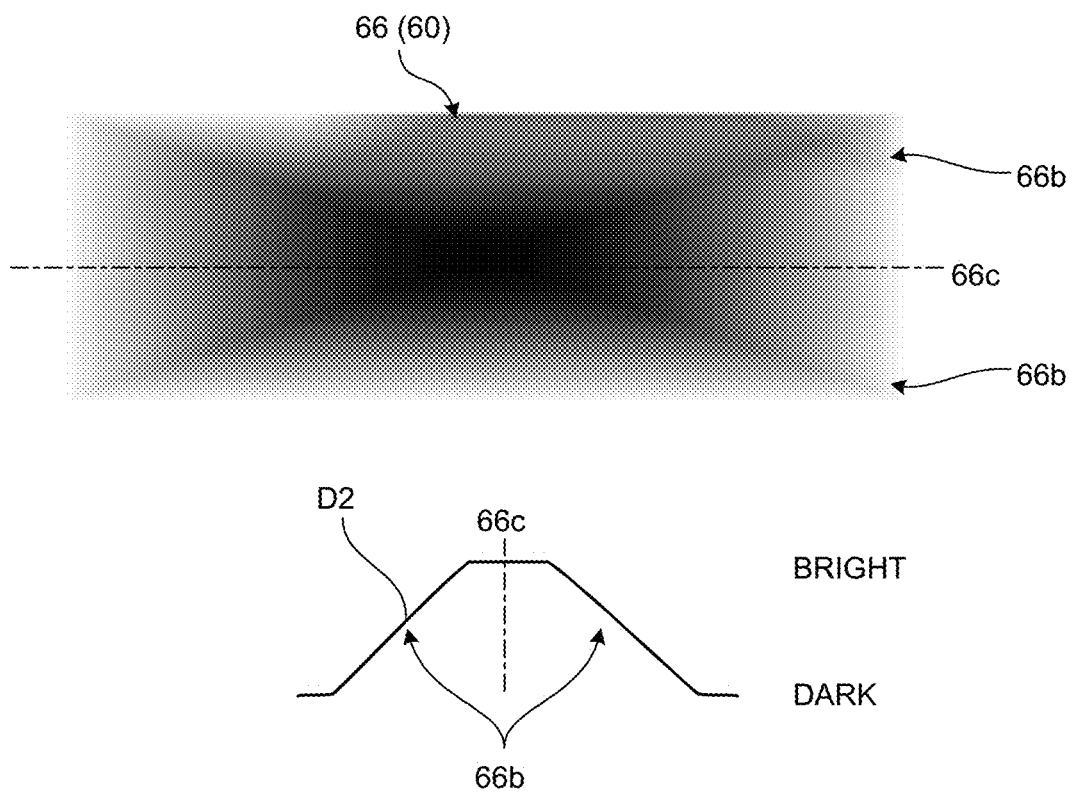
FIG. 19 is a diagram illustrating an image to which gradation is applied.
Figure 20:
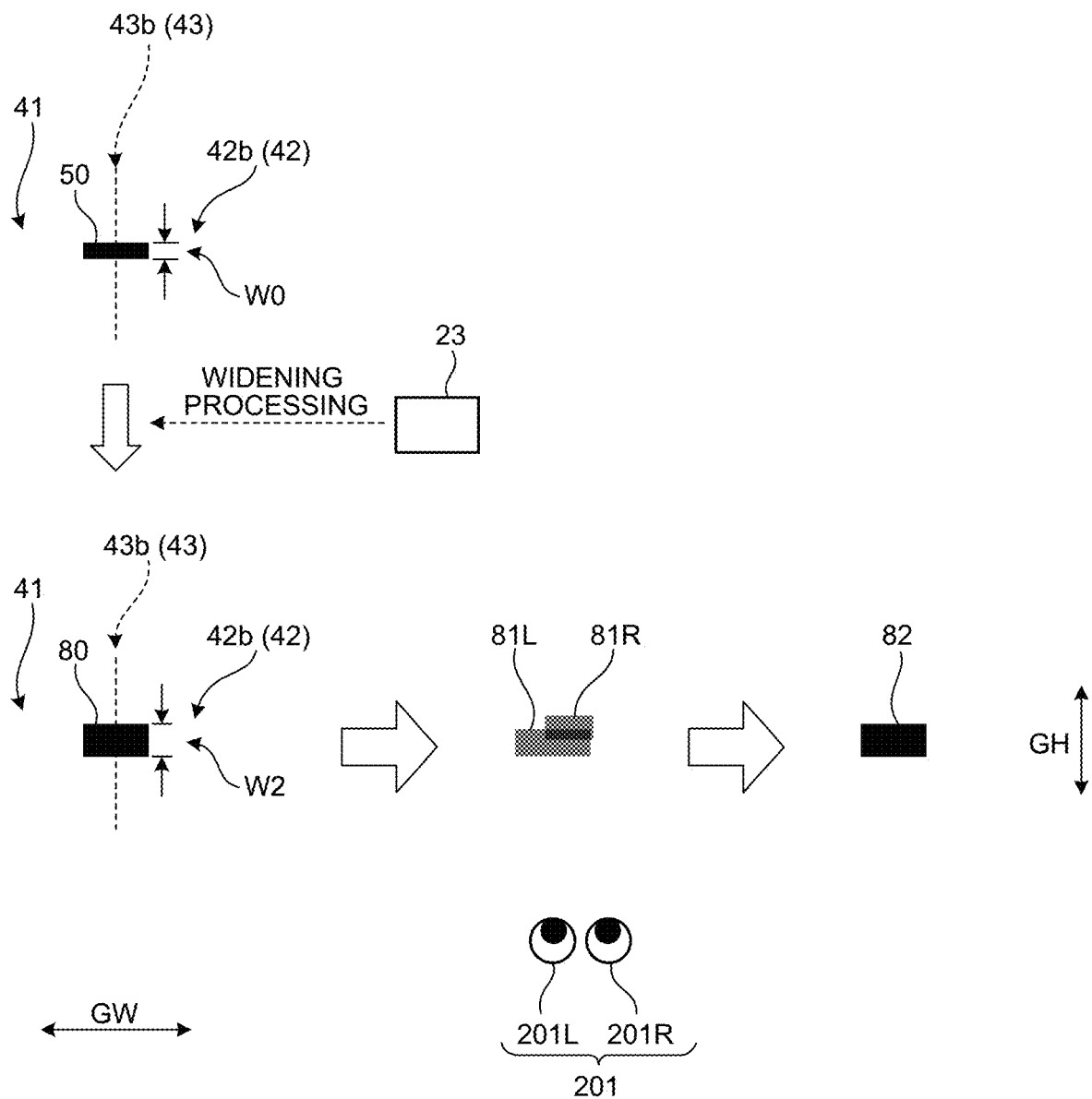
FIG. 20 is a diagram for describing widening processing of the embodiment.

FIG. 11 is a diagram illustrating examples of a graphic image and an image after being processed, FIG. 12 is a diagram illustrating blur processing performed on a graphic image in a second region, FIG. 13 is a diagram illustrating the graphic image displayed as it is in the second region without the blur processing performed thereon, FIG. 14 is a diagram illustrating boundary lines determined according to the positions of the eyes, FIG. 15 is a diagram illustrating examples of the blur intensity defined according to the positions of the boundary lines, FIG. 16 and FIG. 17 are diagrams illustrating distributions of the blur intensity according to the positions of the boundary lines, FIG. 18 is a diagram illustrating the blur intensity set on the front side relative to the boundary lines, FIG. 19 is a diagram illustrating an image to which gradation is applied, and FIG. 20 is a diagram for describing widening processing of the embodiment.

As illustrated in FIG. 1, a vehicle display device 1 according to the embodiment is loaded on a vehicle 100 to configure a head-up display. The vehicle display device 1 is disposed inside an instrument panel 101, for example. The instrument panel 101 includes an opening 101a opened upward. The opening 101a opposes to a windshield 102 in a top-and-bottom direction Z of the vehicle.

The vehicle display device 1 includes a housing 4, a cover 5, an image display unit 20, a controller 23, and an optical system 25. The image display unit 20, the controller 23, and the optical system 25 are housed inside the housing 4. The housing 4 includes a main body 2 and a lid member 3 that is engaged with the main body 2. The main body 2 has an opening part opened upward. The lid member 3 closes the opening of the main body 2 from the above. The lid member 3 includes a wall part 30 that opposes to the opening 101a. The wall part 30 includes an opening 31 opened upward. The housing 4 is disposed such that the opening 31 opposes to the opening 101a. The cover 5 is a plate-like member that closes the opening 31 of the lid member 3. The cover 5 is formed with a transparent resin such as polycarbonate (PC) or acryl, for example.

The image display unit 20 is a device that emits display light 70 of an image. The image display unit 20 illustrated as an example is a liquid crystal display device, and an example thereof may be a Thin Film Transistor-Liquid Crystal Display (TFT-LCD). Note, however, that the image display unit 20 is not limited to the liquid crystal display device. The image display unit 20 may be a device that generates an image on a transmissive screen by scanning laser light, for example.

The optical system 25 includes a first mirror 21 and a second mirror 22. The first mirror 21 reflects the display light 70 emitted from the image display unit 20 toward the second mirror 22. The first mirror 21 is a plane mirror, for example. The second mirror 22 reflects the display light 70 toward the windshield 102. The shape of the reflection face of the second mirror 22 is a freeform surface, for example. The second mirror 22 is a concave mirror that enlarges the display light 70, for example.

The display light 70 reflected by the second mirror 22 passes through the opening 31 and the opening 101a, and it is reflected toward a driver 200 by a reflection face 102a of the windshield 102. A virtual image is formed by the display light 70 making incident on eyes 201 of the driver 200. A wall part 103 in a cylindrical shape is provided to the instrument panel 101. The wall part 103 surrounds an optical path of the display light 70 going from the opening 31 toward the opening 101a.

The controller 23 includes a control circuit configured to control the image display unit 20. The controller 23 is loaded on a control board disposed inside the housing 4, for example. The controller 23 generates an image by controlling the image display unit 20 according to a computer program stored in advance, for example.

The vehicle display device 1 according to the embodiment is configured to be able to display a virtual image by being superimposed on a foreground of the vehicle 100. The controller 23 displays a virtual image by superimposing it on a road face in front of the vehicle 100, on a preceding vehicle of the vehicle 100, on a caution target in front of the vehicle 100, or the like, for example. The vehicle 100 includes a detection unit that detects the target on which the virtual image is to be superimposed. The detection unit includes a camera that captures images of the front side of the vehicle 100 and a sensor that detects objects in front of the vehicle 100, for example. The controller 23 determines the display position of a graphic image 50 to be described later based on the detection result acquired by the detection unit.

The vehicle 100 includes a driver monitor 104. The driver monitor 104 includes a camera disposed on the front side of the driver 200. The driver monitor 104 captures an image of the driver 200 and generates a driver image. The driver monitor 104 detects the positions of the eyes 201 of the driver 200 and the line-of-sight direction of the driver 200 based on the driver image. The detection result acquired by the driver monitor 104 is transmitted to the controller 23.

As illustrated in FIG. 2, the image display unit 20 includes a display face 20a for displaying images. The display light 70 is emitted from the display face 20a. The image display unit 20 may include a backlight unit disposed on a back face side with respect to the display face 20a. As illustrated in FIG. 2, in the vehicle display device 1 of the embodiment, the lid member 3 is a parting member. That is, an image 40 is cut off by the wall part 30 surrounding the opening 31. As for the image 40, a range 40L that can be viewed by the left eye 201L of the driver 200 and a range 40R that can be viewed by the right eye 201R of the driver 200 are determined by the opening 31. The ranges 40L and 40R that can be viewed are the ranges in an image lateral direction GW.

The positions of the eyes 201 illustrated in FIG. 2 are the center position of an eye box EB in a car width direction CW. The eye box EB is a range assumed in advance as the range where the positions of the eyes 201 move. The eye box EB has a prescribed width along the car width direction CW. The vehicle display device 1 is configured such that the driver 200 can view the image 40 when the eyes 201 are within the eye box EB.

FIG. 3 illustrates a state where the positions of the eyes 201 are off to the right side in the eye box EB. In that case, the range 40L that can be viewed by the left eye 201L and the range 40R that can be viewed by the right eye 201R are shifted off to the left side with respect to the positions illustrated in FIG. 2. Therefore, the region that can be viewed by both eyes is shifted off to the left side compared to the case of FIG. 2. Inversely, in a case where the positions of the eyes 201 are off to the left side in the eye box EB, the ranges 40R and 40L that can be viewed are shifted off to the right side with respect to the positions illustrated in FIG. 2. That is, the range that can be viewed by both eyes of the driver 200 changes depending on the positions of the eyes 201 of the driver 200.

A first region 41 illustrated in FIG. 2 is a region that can be viewed by the driver 200 with both eyes. More specifically, the first region 41 is the region that can be viewed by both eyes of the driver 200 regardless of the positions of the eyes 201 within the eye box EB. A second region 42 illustrated in FIG. 2 is a region that is on an end part side in the image lateral direction relative to the first region 41. In other words, the second region 42 is the region excluding the first region 41 from the entire region of the image 40.

The second region 42 is a region that may be viewed only by one eye of the driver 200. The second region 42 has a left-end region 42a and a right-end region 42b. The left-end region 42a is located on the left side with respect to the first region 41 when viewed from the driver 200. The left-end region 42a is the region that may be viewed only by the right eye 201R of the driver 200. At least a part of the left-end region 42a may be viewed by both eyes of the driver 200 depending on the positions of the eyes 201.

The right-end region 42b is located on the right side with respect to the first region 41 when viewed from the driver 200. The right-end region 42b is the region that may be viewed only by the left eye 201L of the driver 200. At least a part of the right-end region 42b may be viewed by both eyes of the driver 200 depending on the positions of the eyes 201.

In the image 40, a boundary line 43 between the first region 41 and the second region 42 is set. The position of the boundary line 43 is fixed. The boundary line 43 of the embodiment includes a first boundary line 43a and a second boundary line 43b. The first boundary line 43a is the boundary line between the left-end region 42a and the first region 41. The second boundary line 43b is the boundary line between the right-end region 42b and the first region 41.

The first boundary line 43a is determined based on the range 40L that can be viewed by the left eye 201L. More specifically, the first boundary line 43a is the left end of the range 40L when the eyes 201 are located on the far left side within the eye box EB. The region on the left side relative to the first boundary line 43a in the image 40 may be unable to be viewed by the left eye 201L in some cases.

The second boundary line 43b is determined based on the range 40R that can be viewed by the right eye 201R. More specifically, the second boundary line 43b is the right end of the range 40R when the eyes 201 are located on the far right side within the eye box EB. The region on the right side relative to the second boundary line 43b in the image 40 may be unable to be viewed by the right eye 201R in some cases.

As described above, the first region 41 of the embodiment is guaranteed to be viewed by both eyes as long as the eyes 201 of the driver 200 are within the eye box EB. In the meantime, the second region 42 is the region that is not necessarily be viewed by both eyes of the driver 200.

As will be described hereinafter, when a graphic shape is displayed across the boundary between the first region 41 and the second region 42, double images may be generated. First, image recognition with no double images will be described. On the left side of FIG. 4, a graphic image 50 displayed in the first region 41 is illustrated. The graphic image 50 is a line segment extended in the image lateral direction GW. In the center of FIG. 4, a virtual image 51L that is viewed by the left eye 201L and a virtual image 51R that is viewed by the right eye 201R are illustrated. Due to parallax, there is a positional shift between the virtual image 51L and the virtual image 51R. When the graphic image 50 is displayed in the first region 41, both eyes of the driver 200 visually recognize the entire graphic image 50. Therefore, the driver 200 can recognize that the virtual images 51L and 51R are a single image of a same shape. As a result, the driver 200 recognizes the graphic image 50 as a single image 52.

On the left side of FIG. 5, the graphic image 50 displayed across the boundary between the first region 41 and the second region 42 is illustrated. In the explanations below, the boundary between the first region 41 and the second region 42 may simply be referred to as "region boundary". The graphic image 50 in FIG. 5 intersects with the second boundary line 43b and it is located across the region boundary. A part of the graphic image 50 is displayed in the first region 41, and a remaining part of the graphic image 50 is displayed in the right-end region 42b. The part of the graphic image 50 displayed in the right-end region 42b cannot be viewed by the right eye 201R of the driver 200. Therefore, the shape of the virtual image 51L viewed by the left eye 201L and the shape of the virtual image 51R viewed by the right eye 201R vary. The driver 200 may not be able to recognize the virtual images 51L and 51R as a single image of a same shape in some cases. As a result, the driver 200 comes to recognize the graphic image 50 as two different images 53 and 54. When such double images are generated, the driver 200 feels a sense of discomfort.

As illustrated in FIG. 6, the controller 23 of the embodiment executes blur processing on the graphic image 50 when the graphic image 50 is across the boundary line 43. As for an image 60 that is being processed by the blur processing, the edge thereof is blurred compared to the graphic image 50 before being processed. In the lower center of FIG. 6, a virtual image 61L viewed by the left eye 201L and a virtual image 61R viewed by the right eye 201R are illustrated. Since the contour is blurred in the image 60 that is being processed, contours of each of the virtual images 61L and 61R are also blurred. Therefore, the virtual images 61L and 61R are not likely to be recognized as different images by the driver 200. As a result, the driver 200 recognizes the virtual images 61L and 61R as a single image 62.

As illustrated in FIG. 7, the vehicle display device 1 according to the embodiment displays the graphic image 50 as it is when displaying the graphic image 50 in the first region 41. In the meantime, when the graphic image 50 is located across the boundary line 43, the vehicle display device 1 executes blur processing on the graphic image 50 and displays the image 60 that is being processed. Thereby, the vehicle display device 1 can suppress a sense of discomfort caused due to generation of double images.

FIG. 8 illustrates an example of the blur processing. On the left side of FIG. 8, the original graphic image 50 and a luminance distribution D0 of the graphic image 50 are illustrated. On the right side of FIG. 8, the image 60 that is being processed and a luminance distribution D1 of the image 60 are illustrated. The waveform of the luminance distribution D0 is a pulse shape. In the luminance distribution D0, the luminance is discontinuous at ends 50b of the graphic image 50. That is, at the ends 50b of the graphic image 50, a pixel of the highest luminance and a pixel of the lowest luminance are adjacent to each other.

In the meantime, in the image 60 that is being processed, the luminance continuously changes at ends 60b of the image 60. That is, at the ends 60b of the image 60, the luminance gradually decreases as leaving away from a center 60c of the image 60. The luminance distribution D1 is calculated by performing filtering on the luminance distribution D0, for example. The filter to be used may be various kinds of known filters for the blur processing, for example. An image width W1 of the image 60 that is being processed is wider than an image width W0 of the graphic image 50. In the embodiment, the blur processing is performed for each of the image lateral direction GW and an image longitudinal direction GH, for example.

FIG. 9 illustrates an example of an intensity distribution B1 regarding the blur intensity. The blur intensity indicates the degree of blur in the blur processing. The higher the blur intensity, the higher the degree of blur. The value of the intensity distribution B1 in the first region 41 is defined as "0". That is, in the first region 41, no blur processing is performed on the graphic image 50. At the boundary line 43, the value of the intensity distribution B1 is defined as a lower limit value A1. The value of the intensity distribution B1 increases as leaving away from the first region 41 along the image lateral direction GW. The increase rate of the intensity distribution B1 decreases as leaving away from the first region 41 along the image lateral direction GW. That is, the shape of the intensity distribution B1 in the second region 42 is an upward convex curvature.

FIG. 10 illustrates another intensity distribution B2 regarding the blur intensity. The value of the intensity distribution B2 in the first region 41 is defined as "0". At the boundary line 43, the value of the intensity distribution B2 is defined as a lower limit value A2. The value of the intensity distribution B2 increases as leaving away from the first region 41 along the image lateral direction GW. For the value of the intensity distribution B2, an upper limit value A3 is set. The value of the intensity distribution B2 in the region away from the first region 41 is the upper limit value A3.

FIG. 11 illustrates examples of the graphic image 50 and the image 60 that is being processed. The shape of the graphic image 50 illustrated in FIG. 11 is a line segment or a rectangle along the image lateral direction GW. In FIG. 11, images 63, 64, and 65 are illustrated as examples of the image 60 that is being processed. The image 63 is an image generated by performing the blur processing on the graphic image 50 with a uniform blur intensity distribution. That is, the image 63 is blurred with the same blur intensity from one end to the other end in the image lateral direction GW.

The image 64 is an image generated by performing the blur processing on the entire graphic image 50 with a higher blur intensity for the part closer to the boundary line 43. That is, the blur intensity is the highest in a first end part 64a located on the boundary line 43. Meanwhile, the blur intensity is lowest in a second end part 64b located most distant from the boundary line 43.

The image 65 is an image generated by performing the blur processing on a part of the graphic image 50 in the vicinity of the boundary line 43 with a higher blur intensity for the part closer to the boundary line 43. That is, the blur intensity is the highest in a first end part 65a located on the boundary line 43. Furthermore, the blur intensity is "0" in a center part 65c. No blur processing is performed on the part between a second end part 65b that is located most distant from the boundary line 43 and the center part 65c.

As illustrated in FIG. 12, the controller 23 may execute the blur processing on a graphic shape not across the region boundary. FIG. 12 illustrates the blur processing for the graphic image 50 in the second region 42. When displaying the graphic image 50 in the second region 42, the controller 23 executes the blur processing on the graphic image 50 and displays the image 60 that is being processed. That is, the controller 23 executes the blur processing on the graphic image 50 in a case where the entire graphic image 50 is in the second region 42 in addition to the case where the graphic image 50 is across the region boundary.

Note that the controller 23 may execute the blur processing only when the graphic shape is across the region boundary. For example, as illustrated in FIG. 13, when the graphic shape intersects with the boundary line 43, the controller 23 displays the image 60 that is being processed. In the meantime, when the entire graphic image 50 is in the second region 42, the controller 23 displays the graphic image 50 as it is in the second region 42 without executing the blur processing.

Note that the controller 23 may be configured to change the boundary line between the first region 41 and the second region 42 depending on the actual eye positions of the driver 200. In that case, for example, the controller 23 changes the boundary line according to the positions of the eyes 201 detected by the driver monitor 104. That is, the position of a boundary line 44 is variable. FIG. 14 illustrates the boundary line 44 that is determined according to the positions of the eyes 201.

The boundary line 44 includes a first boundary line 44a and a second boundary line 44b. The first boundary line 44a is the boundary line between the first region 41 determined according to the positions of the eyes 201 and the left-end region 42a determined according to the positions of the eyes 201. The second boundary line 44b is the boundary line between the first region 41 determined according to the positions of the eyes 201 and the right-end region 42b determined according to the positions of the eyes 201.

The position of the first boundary line 44a and the position of the second boundary line 44b in the image lateral direction GW change depending on the positions of the eyes 201. For example, in a case where the positions of the eyes of the driver 200 are on the rightmost side, the positions of the first boundary line 44a and the second boundary line 44b are positions L1 and R1 illustrated in FIG. 14. In that case, the range of the first region 41 is the range indicated by an arrow Ar1. The range Ar1 is a range shifted to the left end of the display face 20a. In the meantime, when the positions of the eyes of the driver 200 are on the leftmost side, the positions of the first boundary line 44a and the second boundary line 44b are positions L2 and R2 illustrated in FIG. 14. In that case, the range of the first region 41 is the range indicated by an arrow Ar2. The range Ar2 is a range shifted to the right end of the display face 20a.

FIG. 15 illustrates examples of the blur intensity defined according to the positions of the boundary line 44. At different positions in the image lateral direction GW, different blur intensities are applied. The value of the blur intensity increases as leaving away from a center 20c of the display face 20a. For example, as for the first boundary line 44a, the value of the blur intensity increases from the position L2 toward the position L1. As for the second boundary line 44b, the value of the blur intensity increases from the position R1 toward the position R2. The blur intensity may increase linearly toward the end part of the display face 20a as illustrated for the first boundary line 44a, for example. The blur intensity may increase in an upward convex curvature form toward the end part of the display face 20a as illustrated for the second boundary line 44b, for example. The blur intensity may be distributed line-symmetrically with respect to the center 20c.

The controller 23 defines the blur intensity distribution according to the position of the boundary line 44. For example, as illustrated in FIG. 16, in a case where the positions L1 and R1 are selected as the positions of the first boundary line 44a and the second boundary line 44b, the controller 23 sets an intensity distribution B3 based on a blur intensity value A4 defined for the position R1. The intensity distribution B3 is a curve that takes the value A4 at the position R1. Similarly, the controller 23 sets the intensity distribution based on a blur intensity value A5 defined for the position L1.

A case where another position is selected as the position of the boundary line 44 will be described. As illustrated in FIG. 17, when a position different from the position R1 are selected as the position of the second boundary line 44b, the intensity distribution B3 of the blur intensity is set according to the selected position of the second boundary line 44b. This is also the same for the first boundary line 44a. The intensity distribution regarding the blur intensity is set according to the selected position of the first boundary line 44a.

The controller 23 may gradually increase the blur intensity from before the boundary line 44 so that sudden blur does not occur at the boundary line 44. For example, assumed is a case where the graphic image 50 moves from the first region 41 toward the right-end region 42b. In that case, if the image displayed at the instant where the graphic image 50 intersects with the second boundary line 44b changes from the graphic image 50 to the image 60 that is being processed, the driver 200 may feel a sense of incongruity. For this, when the blur intensity is gradually increased from before the boundary line 44, such a sense of incongruity can be suppressed.

FIG. 18 illustrates a part of an intensity distribution B4 set for the position R1. As illustrated in FIG. 18, the intensity distribution B4 starts to increase from before the boundary line 44. In the intensity distribution B4 illustrated in FIG. 18, the value of the blur intensity increases in the first region 41 so that the blur intensity reaches the value A4 at the position R1. Thereby, there is no sudden change in the blur intensity, so that the driver 200 is not likely to feel a sense of incongruity. For example, when the graphic image 50 moves closer to the right-end region 42b within the first region 41, the blur processing for the graphic image 50 is started. As the graphic image 50 gets closer to the right-end region 42b, the blur intensity of the blur processing is increased.

Note that the blur processing may be processing for applying gradation to the graphic image 50. FIG. 19 illustrates an image 66 to which gradation is applied and a luminance distribution D2 of the image 66. The image 66 is an example of the image 60 that is being processed by the blur processing. In the image 66, the luminance continuously and linearly changes at ends 66b of the image 66. At the ends 66b, the luminance gradually decreases as leaving away from a center 66c of the image 66. With such blur processing, it is also possible to suppress generation of double images.

The controller 23 may execute widening processing on the graphic image 50. FIG. 20 is a diagram for describing the widening processing of the embodiment. The widening processing is executed in a case where the graphic image 50 is across the boundary between the first region 41 and the second region 42, for example. The controller 23 executes the widening processing on the graphic image 50 that intersects with the boundary line 43 to generate an image 80 that is being processed. The graphic image 50 before being processed is illustrated in the upper side of FIG. 20, and the image 80 after being processed by the widening processing is illustrated on the lower left side. In the widening processing, the controller 23 widens the image width along the image longitudinal direction GH. An image width W2 of the image 80 after being processed is wider than the image width W0 of the graphic image 50 before being processed.

The controller 23 displays the image 80 that is being processed on the display face 20a.

In the lower center of FIG. 20, a virtual image 81L viewed by the left eye 201L and a virtual image 81R viewed by the right eye 201R are illustrated. Since the image width W2 of the image 80 that is being processed is wide, at least a part of the virtual images 81L and 81R overlap with each other. As a result, the driver 200 recognizes the virtual images 81L and 81R as a single image 82. The degree of widening in the widening processing is set in advance such that the two virtual images 81L and 81R have a part overlapping with each other.

In the example illustrated in FIG. 20, the controller 23 does not execute the blur processing on the graphic image 50. However, the controller 23 may execute both blur processing and widening processing. For example, the controller 23 may execute the blur processing using a filter, and execute the widening processing thereafter on the image 60 that is being processed. Alternatively, the controller 23 may execute the widening processing on the graphic image 50, and may further execute the blur processing using a filter on the image 80 that is being processed.

As described above, the vehicle display device 1 according to the embodiment includes the image display unit 20, the optical system 25, and the controller 23 that controls the image display unit 20. The image display unit 20 emits the display light 70 of the image 40. The optical system 25 projects the display light 70 emitted from the image display unit 20 toward the reflection face in front of the driver 200. The image 40 includes the first region 41 and the second region 42. The first region 41 is the region visually recognized by both eyes of the driver 200. The second region 42 is the region of the image 40 that is on the end part side in the image lateral direction GW relative to the first region 41.

In a case where the graphic image 50 included in the image 40 is across the boundary between the first region 41 and the second region 42, the controller 23 executes the blur processing on the graphic image 50. By executing the blur processing, the virtual image 61L viewed by the left eye 201L and the virtual image 61R viewed by the right eye 201R are not likely to be recognized as different images. In other words, the virtual images 61L and 61R are likely to be recognized as the same image. Therefore, the vehicle display device 1 according to the embodiment can improve the visibility of the image 40.

The controller 23 according to the embodiment executes the blur processing on the graphic image 50 in a prescribed range of the image lateral direction GW including the boundary line 43 between the first region 41 and the second region 42. The controller 23 sets the degree of blur for the graphic image 50 to be the highest at the boundary line 43. The image 60 that is processed by the blur processing may be the images 64 and 65 illustrated in FIG. 11, for example. By setting the degree of blur for the boundary line 43 to be high, the visibility of the image 40 can be improved.

The vehicle display device 1 according to the embodiment includes the driver monitor 104 as the detection unit that detects the positions of the eyes 201 of the driver 200. The controller 23 determines the boundary line 44 between the first region 41 and the second region 42 based on the detection result acquired by the driver monitor 104. With such a configuration, the visibility can be improved further.

The second region 42 of the embodiment has the left-end region 42a and the right-end region 42b. The left-end region 42a is located on the left side with respect to the first region 41 when viewed from the driver 200. The right-end region 42b is located on the right side with respect to the first region 41 when viewed from the driver 200. The controller 23 executes the blur processing for the graphic image 50 on each of the boundary between the first region 41 and the left-end region 42a and the boundary between the first region 41 and the right-end region 42b. Therefore, the vehicle display device 1 according to the embodiment can improve the visibility of the image 40 even when the display position of the graphic image 50 is in the left-end part or the right-end part of the image 40.

Furthermore, in a case where the graphic image 50 is across the boundary between the first region 41 and the second region 42, the controller 23 of the embodiment may execute the widening processing on the graphic image 50 for widening the width in the image longitudinal direction GH. The controller 23 can improve the visibility of the image 40 by the widening processing.

Note that the shape and the display position of the graphic image 50 are not limited to those presented as the examples. The shape of the graphic image 50 is not limited to a line segment or a rectangle along the image lateral direction GW. For example, the graphic image 50 may be an inclined line extended along the image lateral direction GW or a curved line extended along the image lateral direction GW. The shape of the graphic image 50 may be an oval with the image lateral direction GW being the long axis direction. The shape of the graphic image 50 may be a shape that includes a line segment or a curved line along the image lateral direction GW as a part of the graphic image 50. The graphic image 50 may have both line segment along the image longitudinal direction GH and line segment along the image lateral direction GW, for example. In that case, the blur processing or the widening processing may be executed only on the line segment along the image lateral direction GW.

First Modification Example of Embodiment

Figure 21:
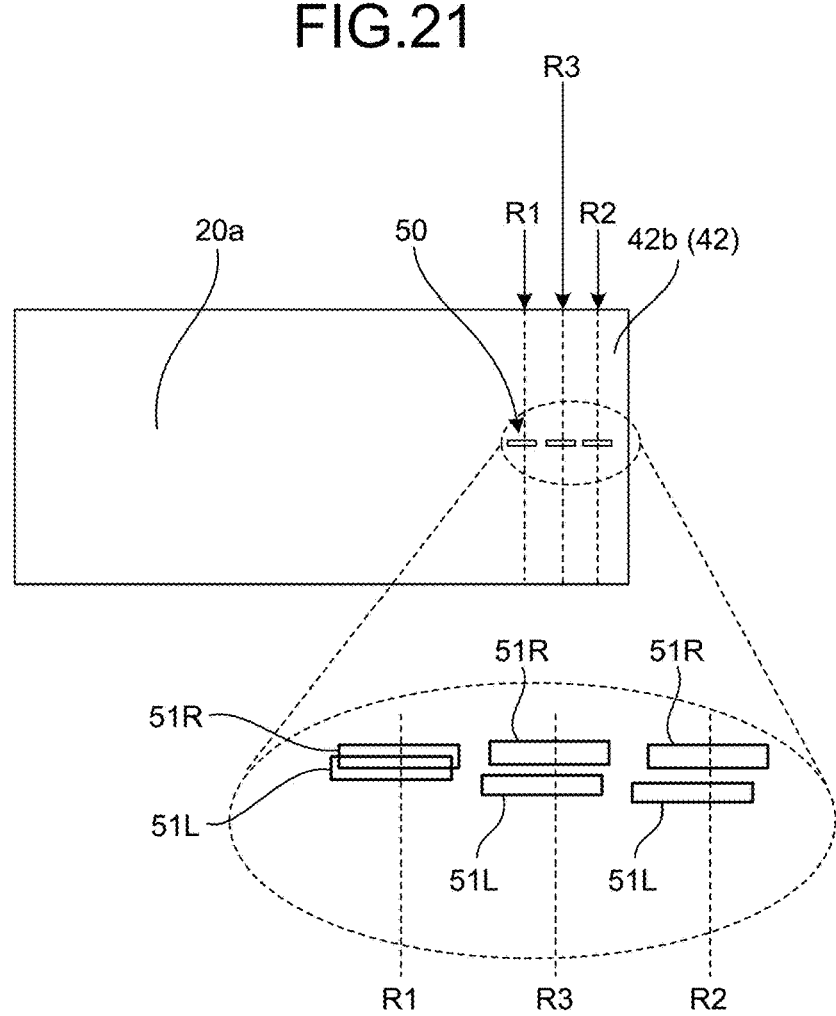
FIG. 21 is a diagram illustrating changes in the parallax depending on the positions in an image lateral direction.

A first modification example of the embodiment will be described. The blur intensity of the blur processing and the degree of widening in the widening processing may be defined according to the optical characteristics. FIG. 21 illustrates changes in the parallax according to the positions in the image lateral direction GW. As described by referring to FIG. 21, the parallax tends to increase as getting closer to the end part along the image lateral direction GW. FIG. 21 illustrates shift in the image when the same graphic image 50 is displayed at each of the position R1, a position R3, and the position R2. Among the position R1, the position R3, and the position R2, the position R1 is closest to the center of the display face 20a in the image lateral direction GW. The position R2 is closest to the end of the display face 20a in the image lateral direction GW.

The shift amount between the position of the virtual image 51L viewed by the left eye 201L and the position of the virtual image 51R viewed by the right eye 201R increases as getting closer to the end part in the image lateral direction GW. The blur intensity of the blur processing may be defined according to the shift amount between the virtual images 51L and 51R. In that case, the blur intensity at the position R1, the position R3, and the position R2 is proportional to the shift amount in the position R1, the position R3, and the position R2, for example. As an example, the blur intensity is defined such that the two virtual images 61L and 61R have the part overlapping with each other at all of the position R1, the position R3, and the position R2.

The degree of widening in the widening processing may be defined according to the shift amount between the virtual images 51L and 51R. In that case, the degree of widening at the position R1, the position R3, and the position R2 is proportional to the shift amount in the position R1, the position R3, and the position R2, for example. It is desirable for the degree of widening at each of the position R1, the position R3, and the position R2 to be defined such that there is no gap generated between the two virtual images 81L and 81R. In other words, it is desirable for the degree of widening at each of the position R1, the position R3, and the position R2 to be defined such that at least a part of the virtual image 81L and at least a part of the virtual image 81R are viewed in an overlapping manner.

Second Modification Example of Embodiment

Figure 22:
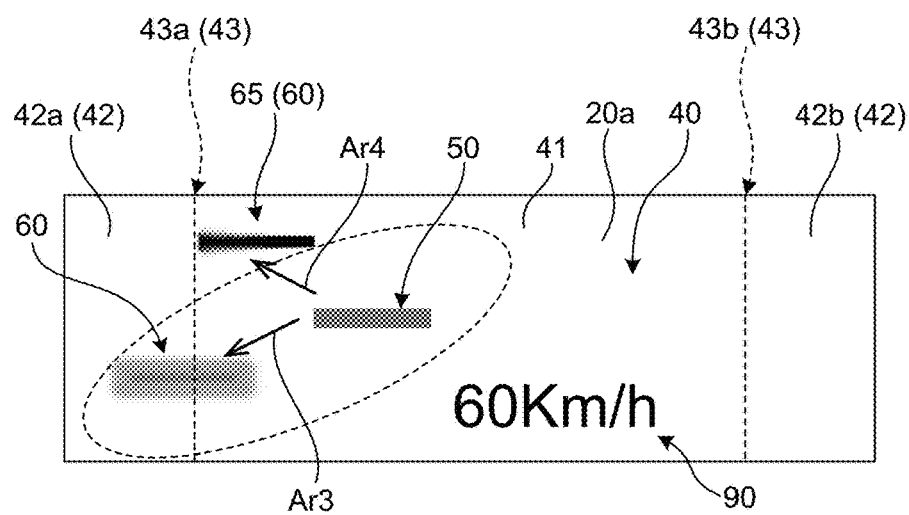
FIG. 22 is a diagram for describing blur processing according to a second modification example of the embodiment.

A second modification example of the embodiment will be described. FIG. 22 is a diagram for describing blur processing according to the second modification example of the embodiment. As will be described hereinafter, the controller 23 may execute the blur processing only on the image that may possibly be displayed across the region boundary. The image 40 illustrated in FIG. 22 includes the graphic image 50 and a speed image 90. The graphic image 50 is an image whose display position is determined according to a relative position of a target for the vehicle 100. The graphic image 50 is displayed in the vicinity of a pedestrian or the like in the front, for example.

The speed image 90 is an image displaying the travel speed of the vehicle 100. The controller 23 displays the speed image 90 in the first region 41 at all times. That is, the speed image 90 is displayed at the position that can be viewed by both eyes of the driver 200 at all times. In that case, the controller 23 does not execute the blur processing on the speed image 90 but executes the blur processing only on the graphic image 50.

For example, as indicated by an arrow Ar3 in FIG. 22, it is assumed that the graphic image 50 moves to the position across the first boundary line 43a. In that case, the controller 23 executes the blur processing on the entire graphic image 50 and displays the image 60 that is being processed. As indicated by an arrow Ar4 in FIG. 22, it is assumed that the graphic image 50 moves to the vicinity of the first boundary line 43a. In that case, the controller 23 may display the image 65 as the image 60 that is being processed. The image 65 is the image acquired by performing the blur processing on a part of the graphic image 50 close to the boundary line 43.

In the meantime, the controller 23 does not execute the blur processing on the speed image 90. For example, the right end of the speed image 90 illustrated in FIG. 22 is located in the vicinity of the second boundary line 43b. As described, even in a case where the speed image 90 is located in the vicinity of the boundary line 43, no blur processing is performed on the speed image 90. Thereby, the visibility of the speed image 90 is improved. Furthermore, because the image as the target of the blur processing is limited, the processing load of the controller 23 can be reduced.

The controller 23 may be configured not to execute the blur processing on the image whose display position does not change. For example, when the display position of the speed image 90 is fixed, the controller 23 does not execute the blur processing on the speed image 90.

The controller 23 may limit the target of the blur processing according to the width of the graphic image 50 in the image longitudinal direction GH. For example, in a case where the graphic image 50 has a large width along the image longitudinal direction GH, double images are not likely to be generated even if there is some parallax. The controller 23 may execute the blur processing only on the graphic image 50 whose width in the image longitudinal direction GH is equal to or less than a lower limit value.

The controller 23 may limit the processing target of the widening processing. For example, the controller 23 may execute the widening processing only on the image that may possibly be displayed across the region boundary. The controller 23 may be configured not to execute the widening processing on the image whose display position does not change. The controller 23 may execute the widening processing only on the graphic image 50 whose width in the image longitudinal direction GH is equal to or less than the lower limit value.

Third Modification Example of Embodiment

A third modification example of the embodiment will be described. The controller 23 may change whether or not to perform the blur processing and the intensity of the blur processing according to the line-of-sight direction of the driver 200. For example, the controller 23 may determine whether or not to perform the blur processing and the intensity of the blur processing according to the line-of-sight direction acquired from the detection result of the driver monitor 104.

The controller 23 determines the graphic image 50 located in the center of the view field of the driver 200 as the target of the blur processing based on the detection result of the driver monitor 104, for example. In that case, the controller 23 may determine to exclude the graphic image 50 located in the peripheral view field from the target of the blur processing.

The controller 23 may change the intensity of the blur processing according to the shift angle of the graphic image 50 with respect to the center of the view field, for example. The intensity of the blur processing may be lowered as the graphic image 50 leaves away from the center of the view field, for example.

The controller 23 may change whether or not to perform the widening processing and the degree of the widening processing according to the line-of-sight direction of the driver 200. For example, the controller 23 determines the graphic image 50 located in the center of the view field of the driver 200 as the target of the widening processing. In that case, the controller 23 may determine to exclude the graphic image 50 located in the peripheral view field from the target of the widening processing. The controller 23 may change the degree of the widening processing according to the shift angle of the graphic image 50 with respect to the center of the view field, for example. The degree of widening in the widening processing may be lowered as the graphic image 50 leaves away from the center of the view field, for example.

Fourth Modification Example of Embodiment

In the embodiment described above, the range that cannot be viewed by both eyes is generated in both end parts of the image 40 in the image lateral direction GW. Note, however, that the range that cannot be viewed by both eyes may be provided only on one side of the image lateral direction GW. For example, the vehicle display device 1 may be configured such that the left-end region 42a is generated in the image 40 but the right-end region 42b is not generated. The vehicle display device 1 may be configured such that the right-end region 42b is generated in the image 40 but the left-end region 42a is not generated.

The content disclosed in the embodiment and the modification examples may be combined as appropriate and executed.

The controller of the vehicle display device according to the present embodiment executes the blur processing on the graphic image, when the graphic image included in the image is across the boundary between the first region and the second region. By executing the blur processing, the image viewed by the left eye and the image viewed by the right eye are not likely to be recognized as different images. Therefore, the vehicle display device according to the present embodiment makes it possible to improve the visibility of the image.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A vehicle display device comprising:
an image display unit that emits display light of an image;
a mirror that is spaced away from the image display unit and is configured to project the display light emitted from the image display unit toward a reflection face of a windshield in front of a driver; and
a controller that controls the image display unit, wherein
the image has a first region that is a region viewed by both eyes of the driver when the eyes are in an eye box and a second region that is a region of the image on an end part side in an image lateral direction relative to the first region, the second region is visible to only one of the eyes when the eyes are in the eye box,
the controller determines a position of the eyes in the eye box,
the controller determines a boundary between the first region and the second region based on the position of the eyes in the eye box, and
in a case where a graphic image included in the image is across the boundary between the first region and the second region, the controller executes blur processing on the graphic image.

2. The vehicle display device according to claim 1, further comprising:
a detection unit that detects positions of the eyes of the driver, wherein
the controller determines a boundary line between the first region and the second region based on a detection result acquired by the detection unit.

3. The vehicle display device according to claim 2, wherein
the second region includes a left-end region located on a left side with respect to the first region when viewed from the driver and a right-end region located on a right side with respect to the first region when viewed from the driver, and
the controller executes the blur processing on the graphic image on each of a boundary between the first region and the left-end region and a boundary between the first region and the right-end region.

4. The vehicle display device according to claim 1, wherein
the second region includes a left-end region located on a left side with respect to the first region when viewed from the driver and a right-end region located on a right side with respect to the first region when viewed from the driver, and the controller executes the blur processing on the graphic image on each of a boundary between the first region and the left-end region and a boundary between the first region and the right-end region.

5. The vehicle display device according to claim 1, wherein the second region is viewed by only one eye of the driver.

6. A vehicle display device comprising:

an image display unit that emits display light of an image;

a mirror that projects the display light emitted from the image display unit toward a reflection face in front of a driver; and a controller that controls the image display unit, wherein the image has a first region that is a region viewed by both eyes of the driver and a second region that is a region of the image on an end part side in an image lateral direction relative to the first region, in a case where a graphic image included in the image is across a boundary between the first region and the second region, the controller executes blur processing on the graphic image, the controller executes the blur processing on the graphic image in a prescribed range of the image lateral direction including a boundary line between the first region and the second region, and the controller increases a degree of blur for the graphic image to be the highest at the boundary line.

7. The vehicle display device according to claim 6, further comprising:

a detection unit that detects positions of the eyes of the driver, wherein the controller determines a boundary line between the first region and the second region based on a detection result acquired by the detection unit.

8. The vehicle display device according to claim 6, wherein the second region includes a left-end region located on a left side with respect to the first region when viewed from the driver and a right-end region located on a right side with respect to the first region when viewed from the driver, and the controller executes the blur processing on the graphic image on each of a boundary between the first region and the left-end region and a boundary between the first region and the right-end region.

9. A vehicle display device comprising:

an image display unit that emits display light of an image;

a mirror that is spaced away from the image display unit and is configured to project the display light emitted from the image display unit toward a reflection face of a windshield in front of a driver; and a controller that controls the image display unit, wherein the image has a first region that is a region viewed by both eyes of the driver when the eyes are in an eye box and a second region that is a region of the image on an end part side in an image lateral direction relative to the first region, the second region is visible to only one of the eyes when the eyes are in the eye box, the controller determines a position of the eyes in the eye box, the controller determines a boundary between the first region and the second region based on the position of the eyes in the eye box, and in a case where a graphic image included in the image is across the boundary between the first region and the second region, the controller executes widening processing on the graphic image for widening a width in an image longitudinal direction.

10. The vehicle display device according to claim 9, wherein the widening processing widens the width in the longitudinal direction such that a virtual image perceived by a right eye of the driver overlaps a virtual imager perceived by the left eye of the driver in the longitudinal direction.

11. The vehicle display device according to claim 9, wherein the second region is viewed by only one eye of the driver.

* * * * *